United States Patent Office 3,763,253
Patented Oct. 2, 1973

3,763,253
VAPOR PHASE PREPARATION OF NORBORNENES
Milton S. Wing and Glenn W. Mathews, Lake Jackson, Tex., assignors to The Dow Chemical Company, Midland, Mich.
No Drawing. Filed May 30, 1972, Ser. No. 258,007
Int. Cl. C07c 5/24
U.S. Cl. 260—666 PY    9 Claims

ABSTRACT OF THE DISCLOSURE

Norbornene and alkyl substituted norbornenes are made by condensing olefins such as ethylene, propylene, etc. with dicyclopentadiene in the vapor phase in a pressurized reactor. The use of a substantial excess of olefin and the use of conditions such that the products and the reactants are in the vapor phase substantially eliminates by-products.

BACKGROUND OF THE INVENTION

This invention relates to a vapor phase process for the preparation of norbornene and alkyl substituted norbornenes by the reaction of lower olefins and dicyclopentadiene.

It is known from the U.S. Pat. 3,007,977 to A. B. Hill et al. that norbornene can be obtained by the reaction of ethylene with impure cyclopentadiene dimers at selected high temperatures and pressures.

However, this process is disadvantageous in that considerable amounts of carbon and resinous material are formed with a slow buildup in the reactor and the associated equipment.

It is also known from the N. B. Lorette application Ser. No. 238,465 filed Mar. 27, 1972 that norbornenes can be made by condensing olefins with cyclopentadiene or its dimer in the presence of an inert solvent. This solvent process, while it is an improvement over the above Hill et al. patent, has disadvantages in that a considerable amount of undesired higher condensation products are produced.

SUMMARY OF THE INVENTION

It now has been discovered that the preparation of norbornenes can be accomplished by reacting lower olefins with cyclopentadiene in the vapor phase with high selectivity to norbornenes and with a shorter reaction time.

The process of this invention comprises generally the steps of continuously feeding a mixture of a lower olefin and dicyclopentadiene having a temperature greater than about 190° C. into a reactor with a substantial excess of olefin, maintaining the temperature, pressure, and residense time in the reactor such that the reactants and the products remain in the vapor phase and the formation of norbornenes are favored and recovering norbornenes.

The more limited process steps comprise feeding a mixture of a lower olefin and dicyclopentadiene into a reactor at a mole ratio in the range from about 1:0.5 to about 40:1 of olefin to dicyclopentadiene wherein the mixture has a temperature from about 200 to about 325° C., maintaining the reactor at a temperature in the range of from about 200 to about 325° C., a pressure in the range from 100 to 2000 p.s.i.g. with a residence time of from about 0.5 to about 20 minutes of the reactants in the reactor such that the reactants and the products are in the vapor phase and recovering norbornenes.

The norbornenes produced are substantially pure and are useful in that they can be converted into toluene or alkyl benzenes without further purification or distillation.

DETAILED DESCRIPTION

The process of this invention is achieved by condensing normal lower alpha mono-olefins such as ethylene, propylene, butene-1, with cyclopentadiene under selected temperatures and pressures to produce norbornene or alkyl substituted norbornenes in the vapor phase.

The alpha olefins used in this process are of a commercial grade having a purity greater than about 50% with less than about 15% by weight of a diolefin content, or 50% of alkane content. It is preferred to use a higher purity olefin.

The cyclopentadiene plus dicyclopentadiene used in this invention is readily available as a by-product from the steam cracking of hydrocarbons. A crude $C_5$ cut from the steam cracking of naphtha and hydrocarbon gases containing 20–25% by weight of cyclopentadiene (CPD) plus dicyclopentadiene (DCPD) with the remainder isoprene, piperylene and other $C_5$ hydrocarbons can be a starting material. Greater or less CPD plus content may be used.

In this invention, dicyclopentadiene was used as a source of cyclopentadiene. It is well known that at temperatures above about 180° C., dicyclopentadiene rapidly decomposes to two moles of cyclopentadiene. Cyclopentadiene would work as a feed material equally as well as does dicyclopentadiene.

The temperature of the reaction can vary from about 200 to about 325° C. with the preferred range being from about 220 to about 290° C.

The pressure of the reaction can vary from about 100 to about 2000 per square inch gauge with the preferred range being from about 200 to about 1000 p.s.i.g.

The residence time of the reactants in the reactor varies from about 0.5 to 20 minutes with the preferred time being from about 2 to 16 minutes.

The temperature and pressure conditions are chosen so that the conditions in the reactor are such that the olefin, cyclopentadiene and norbornenes are above their critical point and hence the reaction is conducted in the vapor phase.

The lower olefins and dicyclopentadiene are mixed together and heated to a temperature greater than 190° C. and preferably in the range from about 200 to about 325° C. and fed into a reactor such that the mole ratio of olefin to dicyclopentadiene is in the range from about 1.0:0.5 to about 40:1 and preferably from about 4:1 to about 20:1.

The reactor used in this process is not critical provided that the reactor walls are inert to the reaction. Stainless steel is the preferred material.

The following examples are presented solely to illustrate and not limit the invention.

Examples 1–6

A stream 940 cubic centimeters per minute of ethylene gas was heated to a temperature of 300° C. by passage through an electrical heating jacket. The ethylene gas flowed into the top of a stainless steel reactor having an O.D. of two inches, a length of two feet and an internal volume of 1470 cc. Just prior to the entry of the ethylene gas into the reactor, 30.1 ml./hour of 97% pure dicyclopentadiene is injected into the stream.

The reactor was maintained at 300° C. by resistance wire heaters wrapped around the length of the reactor. The pressure in the reactor was regulated to 150 pounds per quare inch gauge by a regulator downstream from the reactor.

Since the dicyclopentadiene (DCPD) immediately converts to cyclopentadiene (CPD) in the hot ethylene stream, the ratio of ethylene to CPD is 6:1. The flow of ethylene and CPD is regulated to give a residence time of eight minutes in the reactor.

The effluent from the reactor is passed through a xylene scrubber and a Dry Ice trap to condense the liquid product from the ethylene gas. The liquid product was analyzed by gas chromatography and indicated a 74% conversion of the CPD with 98% selectivity to norbornene. There was no detectable polymer or heavy by-products in the product.

The above example and related examples are summarized in Table I.

TABLE I

| Example | Feed mole ratio (ethylene/CPD) | Temp.,° C. | P.s.i.g. | Reaction time, min. | Percent Conversion | Selectivity |
|---|---|---|---|---|---|---|
| 1 | 6 | 300 | 150 | 8 | 74 | 98 |
| 2 | 6 | 300 | 150 | 16 | 77 | 97 |
| 3 | 2.85 | 300 | 150 | 2 | 52 | 91 |
| 4 | 2.85 | 300 | 150 | 1 | 35 | 98 |
| 5 | 2.85 | 300 | 150 | 4 | 61 | 95 |
| 6 | 2.85 | 300 | 150 | 8 | 71 | 96 |

Substantially the same results as above can be obtained with similar lower olefins such as propylene and butene-1 as long as the reaction conditions are such that the reaction products and reactants are in the vapor form during the reaction.

What we claim is:

1. A highly selective process for the preparation of norbornenes in which the steps comprise
   (1) feeding a mixture of a lower olefin and dicyclopentadiene having a temperature greater than about 190° C. into a reactor with a substantial excess of olefin,
   (2) maintaining the temperature, pressure, and residence time in the reactor such that the reactants and the products remain in the vapor phase and formation of norbornenes are favored, and
   (3) recovering norbornenes.

2. A highly selective process for the preparation of norbornenes in which the steps comprise
   (1) feeding a mixture of a lower olefin and dicyclopentadiene having a temperature from about 200 to about 325° C. into a reactor at a mole ratio in the range from about 1:0.5 to about 40:1 of olefin to dicyclopentadiene,
   (2) maintaining the reactor at a temperature in the range of from about 200 to about 325° C., a pressure in the range of from 100 to 2000 p.s.i.g. with a residence time of from 0.5 to 20 minutes of the reactants in the reactor such that the reactants and the products are in the vapor phase and
   (3) recovering norbornenes.

3. The process of claim 2 in which the lower olefin is ethylene.

4. The process of claim 2 in which the lower olefin is propylene.

5. The process of claim 2 in which the lower olefin is butene-1.

6. In a process for the preparation of norbornenes with high selectivity by feeding a lower olefin and dicyclopentadiene into a reactor with a substantial excess of olefin, maintaining the temperature, pressure and residence time in the reactor such that formation of norbornenes are highly favored, and recovering the norbornenes, the improvement which consists of carrying out the reaction under the above conditions such that the reactants and the products are in the vapor phase.

7. The process of claim 6 wherein the lower olefin is ethylene.

8. The process of claim 6 wherein the lower olefin is propylene.

9. The process of claim 6 wherein the lower olefin is butene-1.

References Cited

UNITED STATES PATENTS

| | | | |
|---|---|---|---|
| 3,007,977 | 11/1961 | Hill et al. | 260—666 PY |
| 2,913,504 | 11/1959 | Hillard, Jr. et al. | 260—666 A |
| 2,994,724 | 8/1961 | Hillard, Jr. et al. | 260—666 A |
| 3,340,315 | 9/1967 | Reuner | 260—666 A |

DELBERT E. GANTZ, Primary Examiner

V. O'KEEFE, Assistant Examiner

U.S. Cl. X.R.

260—666 A